United States Patent
Roberts et al.

(10) Patent No.: US 6,735,259 B1
(45) Date of Patent: May 11, 2004

(54) METHOD AND APPARATUS FOR OPTIMIZATION OF A DATA COMMUNICATIONS SYSTEM USING SACRIFICIAL BITS

(75) Inventors: Kim B. Roberts, Nepean (CA); Wolfgang Oberhammer, Ottawa (CA)

(73) Assignee: Nortel Networks Limited, St. Laurent (CA)

(*) Notice: Subject to any disclaimer, the term of this patent is extended or adjusted under 35 U.S.C. 154(b) by 0 days.

(21) Appl. No.: 09/466,664

(22) Filed: Dec. 20, 1999

(51) Int. Cl.$^7$ .................. H03K 9/00; H04L 27/06; H04L 27/14; H04L 27/22
(52) U.S. Cl. ..................................... 375/316
(58) Field of Search .................. 375/316, 262, 375/285, 220, 355, 260, 347; 455/423, 54.1, 63; 371/48; 714/704

(56) References Cited

U.S. PATENT DOCUMENTS

| | | | |
|---|---|---|---|
| 4,823,360 A | 4/1989 | Tremblay et al. ............... 375/4 |
| 5,271,000 A | 12/1993 | Engbersen et al. ............ 370/13 |
| 5,386,589 A * | 1/1995 | Kanai ......................... 455/423 |
| 5,680,404 A | 10/1997 | Gray .......................... 371/5.1 |
| 5,896,391 A * | 4/1999 | Solheim et al. .............. 714/704 |
| 6,188,737 B1 * | 2/2001 | Bruce et al. ................. 375/355 |

* cited by examiner

Primary Examiner—Stephen Chin
Assistant Examiner—Curtis Odom
(74) Attorney, Agent, or Firm—Kent Daniels; Ogilvy Renault

(57) ABSTRACT

A method and apparatus for using sacrificial bits in a data stream to adjust sampling parameters for the data stream is described. The sacrificial bits are a predetermined sequence of a predetermined length. The sampling parameters are perturbed during transmission or reception of the sacrificial bits in order to provide information useful in adjusting the sampling parameters of the apparatus. Adjustment is accomplished by computing a bit error rate during the perturbing of sampling parameters in order to probe edges of an eye closure of the detected signal. The advantage is faster homing on optimal sampling parameters with little sacrifice of transmission capacity.

55 Claims, 3 Drawing Sheets

METHOD AND APPARATUS FOR OPTIMIZATION OF A DATA COMMUNICATIONS SYSTEM USING SACRIFICIAL BITS

CROSS-REFERENCE TO RELATED APPLICATIONS

This is the first application filed for the present invention.

MICROFICHE APPENDIX

Not Applicable.

TECHNICAL FIELD

The present invention relates to high-speed data communications systems and in particular to a method and apparatus for optimizing the performance of a data communications system.

BACKGROUND OF THE INVENTION

It is well known that signals suffer degradation between the transmitter and receiver, due to various sampling and quantizing effects, and channel effects.

The sampling and quantizing effects comprise the distortion inherent in quantization of a received data signal, which may be a round-off or truncation error, errors introduced by saturation of the quantizer circuitry, and timing jitter. Generally, saturation may be avoided by using automatic gain control (AGC), which extends the operating range of the quantizer. Jitter includes any deviation of the position (i.e. the phase relationship) of the sampling clock with respect to the received data signal, and its effect is equivalent to a frequency modulation of the data signal. Timing jitter is generally controlled with very good power supply isolation and stable clock references.

Signal corruption introduced by the channel is due to such factors as noise, inter-symbol interference, dispersion, etc. The degradation of the recovered data signal quality with the channel induced errors is called "threshold effect".

If the channel noise is small, there will be no problem detecting the presence of a waveform, and the only errors present in reconstruction of the data signal will be due to sampling and quantizing noise. On the other hand, if the channel noise is large, the resultant detection errors cause reconstruction errors. Thermal noise interference from circuit switching transients can cause errors in detecting the signal pulses carrying the digitized symbols (data).

Intersymbol interference is due to the bandwidth of the channel. A band-limited channel tends to spread the pulses, and if the width of the pulse exceeds a symbol duration, overlap with neighboring pulses may occur.

Dispersion is the chromatic or wavelength dependence of a parameter, such as, for example, the distortion caused by different wavelengths of light within a pulse travelling at different speeds through a fiber. The pulse distortion in a fiber optic system may also be caused by some parts of the light pulses following longer paths (modes) than other parts.

The quality of a data signal is expressed in terms of a Bit Error Rate (BER) which is the ratio between the number of erroneous bits counted at a site of interest over the total number of bits received.

In the last decade, transmission rates of data signals have increased dramatically. For high rate transmission, such as at 10–40 Gb/s, signal corruption introduced by the transmission channel is a critical parameter. The demand for receivers with high sensitivity has increased progressively with the transmission rates. The receiver's task is to determine which symbol was actually transmitted. For a given BER, the system performance is dependent upon the slicing level, defined also as threshold level, which is used to discriminate high and low levels of a received data signal. For example, a slicing level variation of only 8% can result in a variation of the receiver sensitivity of up to about 1 dB. Data signal recovery errors may develop as a result of an incorrect slicing level, or incorrect sampling clock/data signal timing (i.e. phase relationship) being selected.

Current optical receivers comprise an avalanche photo-diode (APD), or a high performance PIN photodiode, typically coupled to a transimpedance amplifier. The transimpedance amplifier is a shunt feedback amplifier acting as a current-to-voltage transducer. The received signal is then amplified, and a data decoder (e.g. a single channel super-decoder) extracts a "clean" data signal from the amplified received data signal. Generally, binary data decoders are provided with a fixed slicing level selected such as to provide the best error rate at a predetermined signal power level. However, a fixed slicing level cannot account for the effects of aging of the components, temperature variations, etc. As a result, higher power levels need to be transmitted to account for the above factors, which in turn diminish the length of the transmission channel.

As the requirement for essentially error free operation for fiber systems become more stringent, systems which allow bit detection errors to occur during a normal data signal recovery mode of operation are increasingly less acceptable. Driven by customer demand, sophisticated performance monitors are provided at the receiver site, which perform optimization routines for lowering the BER of the recovered data signal.

It is known to generate a control code at the transmission site which is then transmitted with the payload data over the communication link. Error detection is based, in general, on comparison between the transmitted and the received control code. Error correction is based on various algorithms which compensate for the specific error detected in the control code. This method is known as forward error correction (FEC).

A data decoder including a performance monitor is disclosed in U.S. Pat. No. 4,097,697 (Harman, issued on Jun. 27, 1978 and assigned to Northern Telecom Limited). This patent discloses a data decoder including a first differential amplifier which recovers the data signal by comparing the incoming signal with a fixed slicing level. A second differential amplifier compares the incoming signal with an offset slicing level to produce an errored signal. Both differential amplifiers are clocked by a recovered clock signal. The recovered data signal and the errored signal are compared to each other and the result is used to determine the degradation of the incoming signal.

U.S. Pat. No. 4,799,790 (Tsukamoto et al., issued Jan. 24, 1989 and assigned to Anritsu Corporation) discloses a device comprising a transmitter for launching signals of various wavelengths into a reference or test fiber, and a receiver. At the receiver, the phase difference between two adjacent wavelengths is measured for both the reference and test path for determining the delay of the respective wavelength.

None of the above patents is concerned, however, with providing a simple device and method for detecting and correcting errors in the recovered data signal using information in the data path itself. The receiver circuits described in the above patents rely on duplicate channels and pseudo-error detection.

The extent of signal degradations may be directly measured using an eye closure diagram, which is the graphic pattern produced on an oscilloscope when a baseband signal is applied to the vertical input of the oscilloscope and the symbol rate triggers the instrument time base. For a binary signal, such an eye diagram has a single eye which is open or closed to an extent determined by the signal degradation. For data recovery with low BER, an open pattern is desired. Changes in the eye opening size indicate intersymbol interference, amplitude irregularities, or timing problems.

U.S. Pat. No. 4,823,360 (Tremblay et al., issued Apr. 18, 1989 and assigned to Northern Telecom Limited) discloses a device for measuring chromatic dispersion of an optical fiber based on a baseband phase comparison method, using the eye closure diagram of the data signal received over the transmission link. The device described in this U.S. patent evaluates the transmission link performance using three slicing levels for recovering data. Two of the slicing levels are obtained by measuring on the eye diagram the level of "long 0s" and "long 1s", respectively, for a preset error rate, and the third slicing level is provided in a selected relationship to the other two to produce recovered data signals.

The technique described in Tremblay et al. is based on generating "pseudo-errors" on separate pseudo-error channels. The pseudo-errors give some idea of how error performance varies with the slicing level and, because they do not appear on the in-service transmission path, they do not affect service. Consequently, this technique can be used for dynamic control of in-service systems, and in fact has been used successfully in data transmission systems ranging in bit rate from OC-3 to OC-192 (0.155Gb/s to 10 Gb/s). Unfortunately, the separate pseudo-channels require additional high speed circuitry, and the pseudo-errors may not give a true reflection of error performance in the data path. Furthermore, at 40 Gb/s (OC-768) and above, the parallel decoders required to implement the method of Tremblay et al add excessive capacitance, and thus degrade the performance of the data decoder.

U.S. Pat. No. 5,896,391 (Solheim et al. issued Apr. 20, 1999 and assigned to Northern Telecom Limited) provides a method for recovering a data signal from an incoming signal received over a transmission network. The method provides for preparing a bit error rate (BER) map for a data decoder, determining, on the BER map, an optimal operation point for a provisioned $BER_{prov}$ value, and monitoring the data regenerator to function in the optimal operation point for providing a recovered data signal. In addition, the errors in the recovered data signal may be further corrected using current forward error correction circuitry.

The method of Solheim et al. offers one way of avoiding the use of parallel decoders, such as required by Tremblay et al. However, it entails the risk of perturbing the data decoder to an extent that creates an error burst of sufficient severity that the forward error correction circuitry is unable to correct the errors.

Accordingly, there remains a need for a method and apparatus capable of reliably optimizing the performance of very high speed optical transmission systems.

SUMMARY OF THE INVENTION

An object of the present invention is to provide a method and apparatus for optimizing the performance of a data communications system in which at least one parameter of the data communications system is dynamically adjusted.

A further object of the present invention is to provide a method and apparatus for optimizing the performance of a data communications system in which an error performance of the system is determined in the data path.

Another object of the present invention is to provide a method and apparatus for optimizing the performance of a data communications system in which an optimum level of a parameter is estimated using a block of sacrificial bits embedded within each data frame.

Accordingly, an aspect of the present invention provides a method of optimizing one or more parameters of a data communications system. The method comprises the steps of: receiving a data frame including a respective block of sacrificial bits having a known bit sequence; perturbing a value of a selected parameter of the communications system during reception of the block of sacrificial bits; calculating a bit error rate (BER) corresponding to the perturbed value of the selected parameter; and estimating an optimum value of the selected parameter based on the perturbed value of the selected parameter and the corresponding calculated bit error rate.

A further aspect of the present invention provides an apparatus for optimizing one or more parameters of a data communications system. The apparatus comprises: means for receiving a data signal of one or more data frames including a respective block of sacrificial bits having a known bit sequence; means for perturbing a value of a selected parameter of the communications system during reception of the block of sacrificial bits; means for calculating a bit error rate corresponding to the perturbed value of the selected parameter; and, means for estimating an optimum value of the selected parameter based on the perturbed value of the selected parameter and the corresponding calculated bit error rate.

Preferably, a value of the selected parameter is dynamically adjusted, in accordance with the estimated optimum value, to ensure reliable recovery of the data signal.

In preferred embodiments of the invention, the step of perturbing a value of the selected parameter comprises a step of applying a predetermined offset to a current value of the selected parameter.

The step of calculating a bit error rate corresponding to the perturbed value of the selected parameter preferably comprises the steps of: sampling at least a portion of the block of sacrificial bits using the perturbed value of the selected parameter. The sampled portion of the block of sacrificial bits is analyzed to calculate a corresponding bit error rate.

A preferred embodiment of the invention further comprises the steps of: receiving a plurality of data frames, each data frame including a respective block of sacrificial bits; calculating the bit error rate for each respective block of sacrificial bits using substantially the same perturbed value of the selected parameter; and calculating an average bit error rate in respect of the perturbed value of the selected parameter. In this case, the estimated optimum value of the selected parameter is preferably based on the calculated average bit error rate.

The perturbed parameter may be a level of a slicing level of a receiver unit of the data communications system. The perturbed value can be defined by a predetermined offset above a current value of the slicing level. Alternatively, the perturbed value can be defined by a predetermined offset below a current value of the slicing level.

The perturbed parameter may also be a timing of a sampling clock of a receiver unit of the data communications system. The perturbed value can be a predetermined phase advance of the sampling clock. Alternatively, the perturbed value can be a predetermined phase delay of the sampling clock.

The perturbed parameter may likewise be a transmission power of a transmitter unit of the data communications system. The perturbed value can be a predetermined power offset above a current value of the transmission power. Alternatively, the perturbed value can be defined by a predetermined power offset below a current value of the transmission power.

The step of perturbing a value of the selected parameter preferably comprises applying a selected one of first and second predetermined offset values to a current value of the selected parameter, to thereby define respective first and second perturbed values of the selected parameter. In these embodiments, the step of calculating a bit error rate preferably comprises the steps of calculating respective first and second bit error rates corresponding to the first and second perturbed values of the selected parameter. The estimated optimum value of the selected parameter is preferably based on the calculated first and second bit error rates.

Both of the first and second bit error rates may be calculated on a basis of a single block of sacrificial bits. In this case, the step of calculating respective first and second bit error rates comprises the steps of: sampling a first portion of the block of sacrificial bits using the first perturbed value of the selected parameter; analyzing the sampled first portion of the block of sacrificial bits to calculate the first bit error rate; sampling a second portion of the block of sacrificial bits using the second perturbed value of the selected parameter; and analyzing the sampled second portion of the block of sacrificial bits to calculate the second bit error rate.

The first bit error rate may alternatively be calculated in respect of a first set of one or more data frames, and the second bit error rate may be calculated in respect of a second set of one or more data frames. In this case, the step of calculating the first bit error rates comprises the steps of: sampling, using the first perturbed value of the selected parameter, at least a portion of each respective block of sacrificial bits of the first set of one or more data frames; analyzing the sampled portion of each respective block of sacrificial bits to calculate a corresponding bit error rate; and, calculating the first bit error rate by averaging the corresponding bit error rates calculated in respect of each data frame of the first set.

Similarly, the step of calculating the second bit error rate preferably comprises the steps of: sampling, using the second perturbed value of the selected parameter, at least a portion of each respective block of sacrificial bits of the second set of one or more data frames; analyzing the sampled portion of each respective block of sacrificial bits to calculate a corresponding bit error rate; and calculating the second bit error rate by averaging the corresponding bit error rates calculated in respect of each data frame of the second set.

Preferably, the first and second perturbed values are selected such that the corresponding first and second bit error rates are at least one order of magnitude (10×) higher than a bit error rate obtained using a nominal value of the parameter under normal operating conditions of the data communications network.

In embodiments wherein the parameter is the slicing level of a receiver unit of the data communications system, the first perturbed value is preferably defined by a predetermined first offset above a current value of the slicing level, and the second perturbed value is preferably defined by a predetermined second offset below the current value of the slicing level.

In embodiments wherein the parameter is a timing of a sampling clock of a receiver unit of the data communications system, the first perturbed value is preferably a predetermined phase advance of the sampling clock, and the second perturbed value is a predetermined phase delay of the sampling clock.

In embodiments wherein the parameter is a transmission power of a transmitter unit of the data communications system, the first perturbed value is preferably defined by a predetermined first power offset above a current value of the transmission power, and the second perturbed value is preferably defined by a predetermined second power offset below the current value of the transmission power.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

Figure 1:
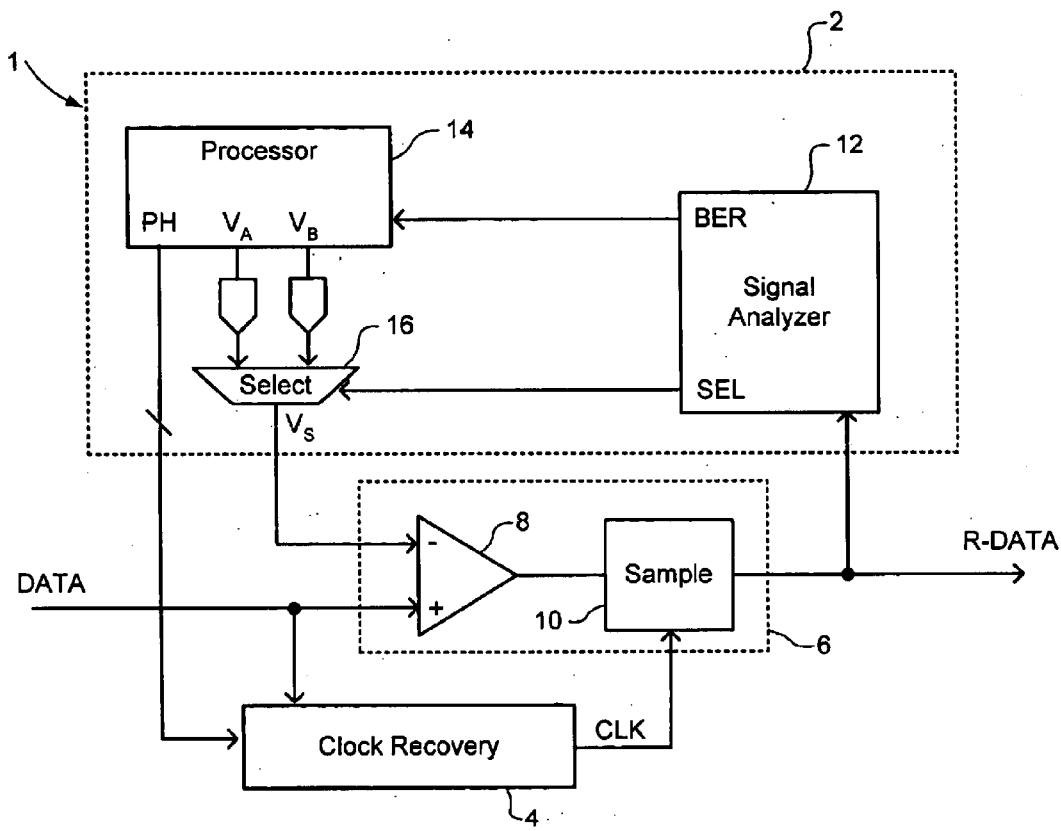
FIG. 1. is a block diagram schematically illustrating a parameter optimization system in accordance with a first embodiment of the present invention.

As shown in FIG. 1, an optimization system 2 in accordance with a first embodiment of the present invention is employed to optimize one or more parameters of a receiver unit 1 of a communications system. The receiver unit 1 comprises a clock recovery circuit 4; and a data decoder 6 ( e.g. a single-channel superdecoder) including a threshold comparator 8 and a sampling circuit 10. The optimization system 2 comprises a signal analyzer 12, a processor 14, and a threshold selector 16.

The clock recovery circuit 4 operates in a conventional manner to produce a sampling clock signal CLK phase and frequency locked to the incoming data signal DATA. Similarly, the data decoder 6 operates in a conventional manner to produce a recovered data signal R-DATA. Thus the threshold comparator 8 compares the incoming data signal DATA to a slicing level $V_s$ to discriminate logical high and low levels of the incoming data signal DATA. The output signal of the threshold comparator 8 is sampled by the sampling circuit 10, at a timing of the recovered clock signal CLK to produce the recovered data signal R-DATA.

The recovered data signal R-DATA is supplied to the signal analyzer 12 which determines a Bit Error Rate (BER) during each received data frame (as will be described in greater detail below). The BER determined by the signal analyzer 12 is supplied to the processor 14, which uses the BER to calculate a pair of threshold levels $V_A$ and $V_B$. These threshold levels $V_A$, $V_B$ are supplied to the selector 16, which operates under control of the signal analyzer 12 to supply one of the threshold levels $V_A$, $V_B$ to the threshold comparator 8 as the slicing level $V_s$ used to discriminate high and low levels of the incoming data signal DATA. The operation of the optimization system 2 of FIG. 1 is described below with reference to the eye closure diagram of FIG. 2.

Figure 2:
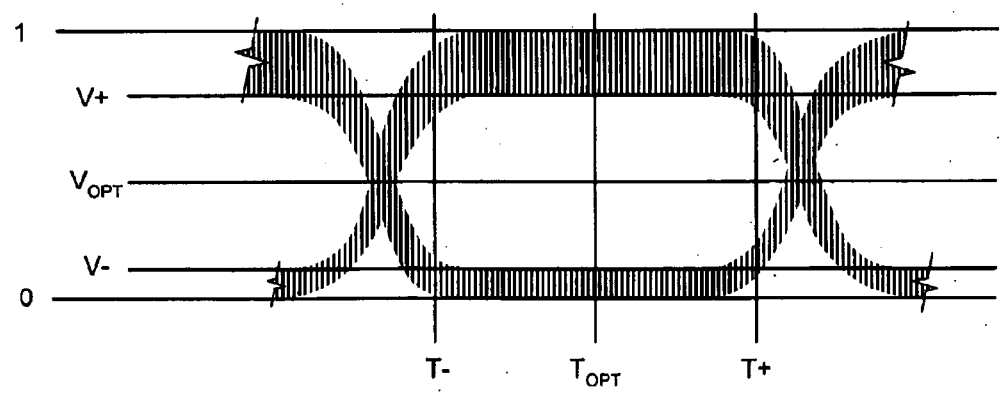
FIG. 2 is an eye-closure diagram schematically illustrating principles of operation of the parameter optimization system of FIG. 1.

FIG. 2 shows an eye closure diagram of the incoming data signal DATA) indicated by vertical shading). Vertical lines indicate respective sampling times corresponding to the timing (phase relationship) of the recovered clock signal CLK with respect to the incoming data signal. An optimum sampling time is identified at $T_{OPT}$, and respective phase-advanced and phase-delayed sampling times are indicated at T+ and T−. Horizontal lines on the eye closure diagram represent respective slicing levels used for discrimination of high and low levels of the incoming data signal DATA. An optimum slicing level is indicated at $V_{OPT}$, and respective offset-high and offset-low slicing levels are indicated at V+, and V−.

In accordance with the present invention, each frame of the data transmission system is assigned a block of N sacrificial bits. The sacrificial bits are transmitted sequentially, and have a predetermined bit pattern and location within the frame. In a preferred embodiment, the number N of sacrificial bits is 128, which may include a $2^7-1$ pseudo-random sequence of 127 bits with a 0 bit appended at the end of the pseudo-random sequence. The block of sacrificial bits is inserted into the frame as a contiguous sequence of bits at a fixed predetermined location within each frame. Because the location and bit-length of the block of sacrificial bits is known, the signal analyzer 12 can readily monitor the incoming data signal DATA and identify the block of sacrificial bits within each frame. Because the sequence of bits within each block is known, the optimization system 2 of the present invention is enabled to analyze the error performance of the data decoder 6 in the data path, and thus optimize one or more parameters of the communications system (as will be described in greater detail below).

As mentioned previously, the processor 14 outputs a pair of threshold levels $V_A$ and $V_B$. In the illustrated embodiment, $V_A$ corresponds to the optimum slicing level $V_{OPT}$, and is calculated on the basis of the BER as will be described below. The other threshold level, $V_B$, is used to perturb the slicing level $V_s$ used by the threshold comparator 8 to discriminate logical high and low levels of the incoming data signal DATA. Thus in operation, $V_B$ will correspond to one of the offset-high slicing level V+, and the offset-low slicing level V−.

In operation, the signal analyzer 12 monitors bits of the recovered data signal R-DATA, while controlling the selector 16 to supply the calculated optimum slicing level $V_{OPT}$ (=$V_A$) to the threshold comparator 8 as the slicing level $V_s$, so that discrimination of high and low levels of the incoming data signal is performed on the basis of the optimum slicing level $V_{OPT}$. However, during reception of each block of sacrificial bits, the signal analyzer 12 controls the selector 16 to supply the perturbed slicing level $V_B$ to the threshold comparator 8. As shown in FIG. 2, $V_B$ is selected such that the resulting slicing level (either V+ or V−) is within the noise band of the incoming data signal DATA. Consequently, during reception of each block of sacrificial bits, the discrimination of high and low levels of the incoming data signal R-DATA is subject to a high level of error. During this time, the signal analyzer 12 monitors the recovered data signal R-DATA (the discriminated and sampled sacrificial bits) and, by comparison with the known bit sequence of the sacrificial bits, calculates a value of the bit error rate (BER). The signal analyzer 12 then passes the BER to the processor 14, which uses the value of the BER, in combination with the value of the perturbed slicing level $V_B$, to calculate a new value of $V_A$. The processor 14 can also use the value of the BER to calculate a new value of the perturbed slicing level $V_B$. This latter operation allows the processor 14 to dynamically adjust the value of $V_B$ and thereby probe the edges of the noise band to determine the effective eye-opening.

Preferably, $V_B$ is adjusted so that the bit error rate calculated by the signal analyzer 12 during reception of each block of sacrificial bits is at least one order of magnitude (10×) greater than a bit error rate obtained using $V_A$ (=$V_{OPT}$). This can be monitored by the signal analyzer 12, by periodically controlling the selector 16 to supply $V_A$ to the threshold comparator 8 during reception of one or more blocks of sacrificial bits, to thereby allow accurate calculation of the BER using $V_{OPT}$ as the slicing level $V_s$.

In principle, the value of $V_B$ can be maintained at only one of the offset-high or offset-low slicing levels V+, V−. For example, the processor can be designed to calculate a level of $V_B$ to probe the high-level noise band of the incoming data signal DATA. In this case, during reception of each block of sacrificial bits, the selector 16 would be controlled to supply $V_B$ (=V+) to the threshold comparator 8, and the BER calculated by the signal analyzer 12. The BER would then be passed to the processor 14 which calculates new values of $V_A$ =$V_{OPT}$, and, possibly, $V_B$. A similar mode of operation can be applied using the offset-low slicing level V− as the value of $V_B$, so that perturbing of the slicing level is used to probe the low-level noise band of the incoming data signal DATA.

Improved resolution of the value of $V_{OPT}$ (=$V_A$) can be obtained, however, by perturbing the slicing level $V_s$ in such a manner as to probe both the high-level noise band and the low-level noise band of the incoming data signal DATA. In the embodiment of FIG. 1, this operation is accomplished by alternately setting the value of $V_B$ equal to V+ and V−, and calculating respective values of the bit error rate corresponding to each of these high and low slicing levels. Theoretically, it is possible to sample a first portion of a single block of sacrificial bits using V+ as the slicing level $V_s$, and then sample a remaining portion of that same block of sacrificial bits using V− as the slicing level $V_s$. Values of BER for each portion of the sampled block of sacrificial bits can then be obtained and used to calculate a new value of $V_A$. However, at the high bit rates contemplated (40 Gb/s and higher) the selector 16, signal analyzer 12 and processor 14 generally cannot respond quickly enough to yield reliable results. Accordingly, in a preferred embodiment, the value of $V_B$ is set equal to V+, and then a BER calculated for a first set of one or more successive blocks of sacrificial bits sampled using that slicing level. The value of $V_B$ is then set equal to V−, and a value of the BER calculated for a second set of one or more successive blocks of sacrificial bits sampled using that slicing level. Advantageously, the value of $V_B$ is held at each respective offset value V+, V− for a sequential series of more than one (preferably more than ten) successive blocks of sacrificial bits, and an average value of the BER calculated over the entire series. This effectively reduces the response time of the optimization system 2, and thereby improves its resistance to noise and switching transients within the input data signal DATA.

FIGS. 1 and 2 also illustrate optimization of a second parameter of the communications system 1, which may be implemented either alone or in combination with optimization of the slicing level $V_s$ described above. As shown in FIG. 2, this second parameter is a timing of the sample clock signal CLK which is used for sampling the output signal of the threshold comparator 8. An optimum sample timing $T_{OPT}$ is set so that the output of the threshold comparator 8 is sampled at a maximum eye opening portion of the incoming data signal DATA. Any shift in the phase of the sample clock CLK (i.e. towards either T+ or T– in FIG. 2) will result in an increased bit error rate at any value of the slicing level $V_s$. Thus it is advantageous to probe opposite ends of the eye during reception of one or more blocks of sacrificial bits, in order to dynamically probe the phase position of $T_{OPT}$ and optimize the phase of the sample clock CLK.

One method of accomplishing this result is to design the clock recovery circuit 4 to produce a plurality of clock signals all of which are frequency locked to the incoming data signal, but each having a respective unique phase offset. During reception of sacrificial bits ( of one or more blocks of sacrificial bits) the processor 14 can control the clock recovery circuit to select one of the plurality of clock signals as the sample clock CLK used for sampling the threshold comparator 8 output. For example, a clock signal having a phase corresponding to T– or some phase between $T_{OPT}$ and T– (see FIG. 2) may be selected. The value of $T_{OPT}$ can thus be adjusted, if appropriate, by comparing a bit error rate obtained at the new sample clock phase.

Perturbing the sample clock phase can also be combined with noise level probing. For example, the clock phase can be perturbed by selecting one of the plurality of sample clock signals. Probing of the high and low level noise bands of the incoming data signal DATA can then be performed by perturbing the slicing level $V_s$ around V+ and V– as described above. The difference in the eye opening between $T_{OPT}$ and T– can then be estimated by comparing bit error rates obtained at V+ and V– at each respective phase timing. A similar probing of the opposite end of the eye opening can be performed by selecting a clock signal having a phase corresponding to T+, and then probing the high- and low-level noise bands of the incoming data signal using V+ and V– as the slicing levels. Comparison between the respective bit error rates for slicing levels of V+ and V– obtained using clock signals having phases corresponding to T– and T+, allows the phase position of maximum eye opening (and thus the optimum timing $T_{OPT}$ of the sample clock signal CLK) to be estimated. This estimate may be used to optimize the communications system 1 by either: controlling the lock recovery circuit 4 to adjust the phase of the sample lock signal CLK to correspond with the estimated optimum timing $T_{OPT}$; or by selecting one of the plurality of clock signals having a phase which most closely approximates the estimated optimum timing $T_{OPT}$ as a new sample clock signal CLK.

Figure 3A:
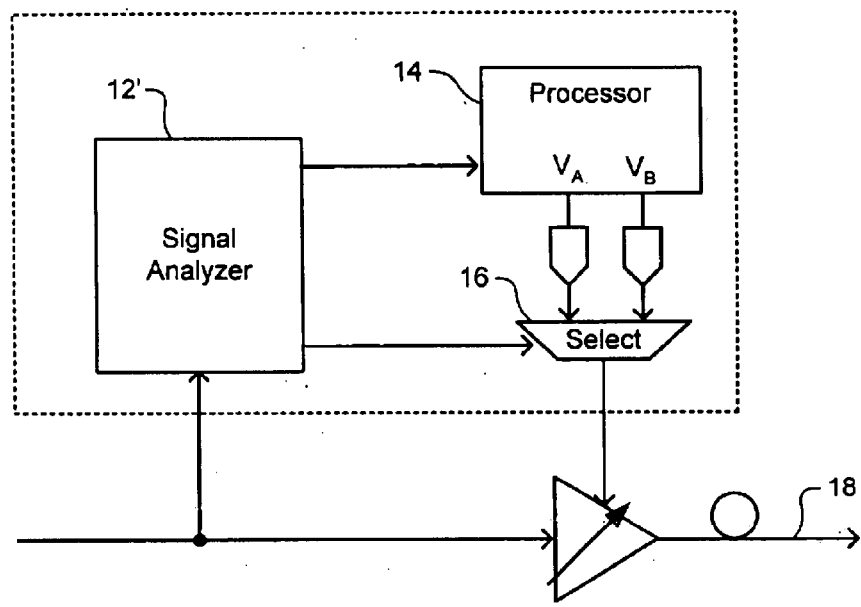
FIGS. 3a and 3b are block diagrams schematically illustrating respective components of a parameter optimization system in accordance with a second embodiment of the present invention.
Figure 3B:
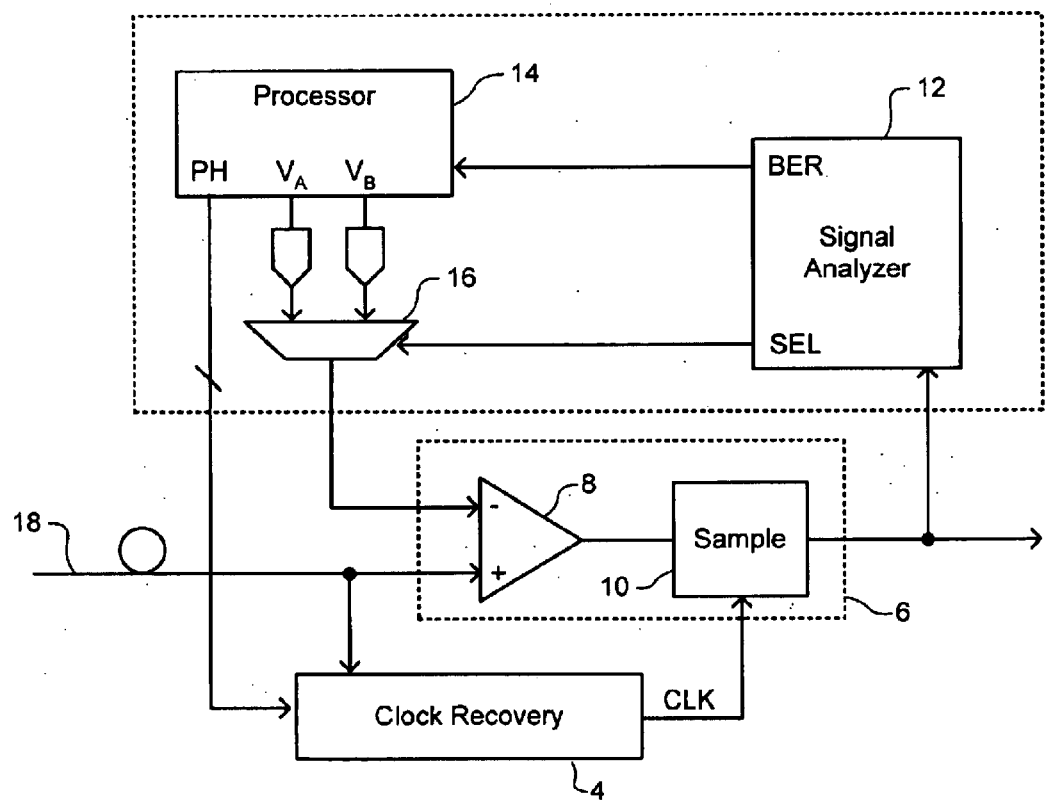

FIGS. 3a and 3b show respective transmitter and receiver components of an optimization system 2' in accordance with a second embodiment of the present invention;

FIG. 3a shows a transmitter component of the optimization system 2' at a transmission end of a communications link 18 in which the signal analyzer 12', selector 16, and processor 14 are used to selectively attenuate the data signal during transmission of each block of sacrificial bits.

FIG. 3b shows a receiver of the optimization system 2' at the receiving end of the communications link 18, which may conveniently be closely similar to the embodiment of the invention described above with respect to FIGS. 1 and 2. In this case, however, attenuation of the data signal during transmission of each block of sacrificial bits means that the width of eye opening at the receiving end of the communications link will be significantly narrowed. In some applications, this narrowing of the eye opening may be useful to enable optimum values of the slicing level $V_{OPT}$ and timing $T_{OPT}$ of the recovered clock signal CLK to be estimated with greater precision.

Figure 4:
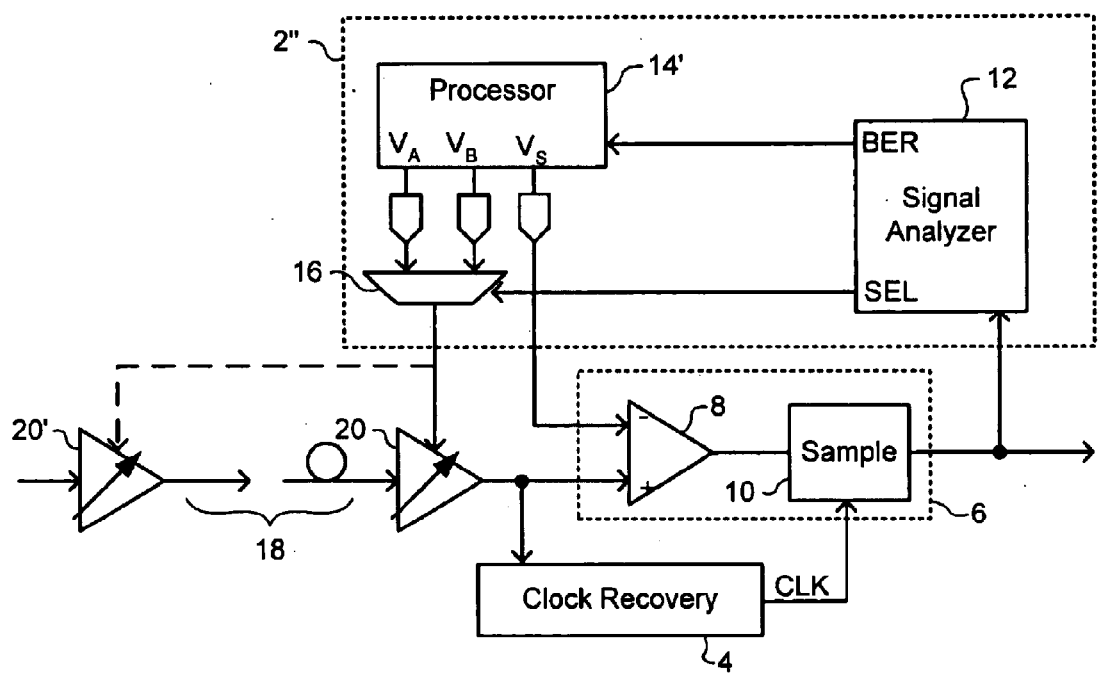
FIG. 4 is a block diagram schematically illustrating a parameter optimization system in accordance with a third embodiment of the present invention.

FIG. 4 shows an optimization system 2" in accordance with a third embodiment of the present invention. As shown in FIG. 4 the signal analyzer 12 monitors the recovered data signal and calculates a bit error rate during reception of each block of sacrificial bits, in the manner described above with respect to the embodiment of FIG. 1. The processor 14' uses the bit error rate to generate a slicing level $V_s$ and a pair of attenuation levels $V_A$ and $V_B$. The slicing level $V_s$ is supplied to the threshold comparator 8 for discrimination of high and low levels of the incoming data signal. The attenuation values $V_A$ and $V_B$ are supplied to the selector 16 which operates under the control of the signal analyzer to supply one of the attenuation signals to a variable amplifier 20 as an amplifier control signal. Similarly to the embodiment of FIG. 1, the attenuation value $V_A$ conveniently corresponds to a calculated optimum value of the amplifier control signal, and is used to control the variable amplifier 20 to adjust the power of the input data signal to a level which enables optimum data signal recovery using the slicing level $V_s$. The other attenuation value, $V_B$, is used to perturb the amplifier control signal during reception of each block of sacrificial bits. Accordingly, during reception of each block of sacrificial bits, the signal analyzer 12 controls the selector 16 to pass the second attenuation signal $V_B$ to the variable amplifier 20 as the amplifier control signal and so perturb the power of the incoming data signal. The corresponding bit error rate calculated by the signal analyzer 12 during reception of each block of sacrificial bits can then be used by the processor 14' to estimate an optimum value of the amplifier control signal, and so adjust the value of the first attenuation signal $V_A$.

This third embodiment is similar to the embodiment of FIGS. 3a and 3b, except that in this case, perturbing of the data signal power is accomplished at the receiver end of the communications link. As in the embodiments of FIGS. 3a and 3b, perturbing of the data signal power alters (narrows or widens) the effective eye opening, and therefore, allows estimation of an optimum signal power for any given slicing level $V_s$ and sampling clock timing. However, by perturbing the data signal at the receiving end of the communications link, any noise in the data signal is also amplified (or attenuated). This may be overcome by modifying the communications system to permit the optimization system 2" at the receiver end of the communications link 18 to control a variable amplifier 20' located at the transmitter end of the link 18. This permits the effective eye opening to be narrowed during transmission of sacrificial bits, without also attenuating noise due to, for example, optical signal dispersion within the communications link 18.

The embodiment(s) of the invention described above is(are) intended to be exemplary only. The scope of the invention is therefore intended to be limited solely by the scope of the appended claims.

We claim:

1. A method of optimizing one or more parameters of a data communications system, the method comprising the steps of:

a) receiving a data frame over a link of the communications system, the data frame including a block of sacrificial bits having a predetermined bit sequence;

b) perturbing a value of a selected parameter of the communications system during reception of the block of sacrificial bits;

c) calculating a bit error rate corresponding to the perturbed value of the selected parameter; and d) computing an estimated optimum value of the selected parameter based on the perturbed value of the selected parameter and the corresponding calculated bit error rate.

2. A method as claimed in claim 1, wherein the one or more parameters comprises any one or more of: a level of a discrimination threshold of a receiver unit of the data communications system; a timing of a sampling clock of a receiver unit of the data communications system; and a transmission power of a transmitter unit of the data communications system.

3. A method as claimed in claim 1, further comprising a step of adjusting a value of the selected parameter in accordance with the estimated optimum value.

4. A method as claimed in claim 1, wherein the step of perturbing a value of the selected parameter comprises a step of applying a predetermined offset to a current value of the selected parameter.

5. A method as claimed in claim 4, wherein the step of calculating a bit error rate corresponding to the perturbed value of the selected parameter comprises the steps of:

a) sampling at least a portion of the block of sacrificial bits using the perturbed value of the selected parameter; and b) analyzing the sampled portion of the block of sacrificial bits to calculate a bit error rate corresponding to the perturbed value of the selected parameter.

6. A method as claimed in claim 1, further comprising the steps of:

a) receiving a plurality of data frames, each data frame including a respective block of sacrificial bits;

b) calculating the bit error rate for each respective block of sacrificial bits using substantially the same perturbed value of the selected parameter; and c) calculating an average bit error rate in respect of the perturbed value of the selected parameter.

7. A method as claimed in claim 6, wherein the estimated optimum value of the selected parameter is based on the calculated average bit error rate.

8. A method as claimed in claim 1, wherein the parameter is a level of a discrimination threshold of a receiver unit of the data communications system.

9. A method as claimed in claim 8, wherein the perturbed value is defined by a predetermined offset above a current value of the discrimination threshold.

10. A method as claimed in claim 8, wherein the perturbed value is defined by a predetermined offset below a current value of the discrimination threshold.

11. A method as claimed in claim 1, wherein the parameter is a timing of a sampling clock of a receiver unit of the data communications system.

12. A method as claimed in claim 11, wherein the perturbed value is defined by a predetermined phase advance of the sampling clock.

13. A method as claimed in claim 11, wherein the perturbed value is defined by a predetermined phase delay of the sampling clock.

14. A method as claimed in claim 1, wherein the parameter is a transmission power of a transmitter unit of the data communications system.

15. A method as claimed in claim 14, wherein the perturbed value is defined by a predetermined power offset above a current value of the transmission power.

16. A method as claimed in claim 14, wherein the perturbed value is defined by a predetermined power offset below a current value of the transmission power.

17. A method as claimed in claim 1, wherein the step of perturbing a value of the selected parameter comprises applying a selected one of first and second predetermined offset values to a current value of the selected parameter, to thereby define respective first and second perturbed values of the selected parameter.

18. A method as claimed in claim 17, wherein the step of calculating a bit error rate comprises the steps of calculating respective first and second bit error rates corresponding to the first and second perturbed values of the selected parameter.

19. A method as claimed in claim 18, wherein the estimated optimum value of the selected parameter is based on the calculated first and second bit error rates.

20. A method as claimed in claim 18, wherein both of the first and second bit error rates are calculated on a basis of a single block of sacrificial bits.

21. A method as claimed in claim 20, wherein the step of calculating respective first and second bit error rates comprises the steps of:

a) sampling a first portion of the block of sacrificial bits using the first perturbed value of the selected parameter;

b) analyzing the sampled first portion of the block of sacrificial bits to calculate the first bit error rate;

c) sampling a second portion of the block of sacrificial bits using the second perturbed value of the selected parameter; and d) analyzing the sampled second portion of the block of sacrificial bits to calculate the second bit error rate.

22. A method as claimed in claim 18, wherein the first bit error rate is calculated in respect of a first set of one or more data frames, and the second bit error rate is calculated in respect of a second set of one or more data frames.

23. A method as claimed in claim 22, wherein the step of calculating the first bit error rates comprises the steps of:

a) sampling, using the first perturbed value of the selected parameter, at least a portion of each respective block of sacrificial bits of the first set of one or more data frames;

b) analyzing the sampled portion of each respective block of sacrificial bits to calculate a corresponding bit error rate; and c) calculating the first bit error rate by averaging the corresponding bit error rates calculated in respect of each data frame of the first set.

24. A method as claimed in claim 22, wherein the step of calculating the second bit error rates comprises the steps of:

a) sampling, using the second perturbed value of the selected parameter, at least a portion of each respective block of sacrificial bits of the second set of one or more data frames;

b) analyzing the sampled portion of each respective block of sacrificial bits to calculate a corresponding bit error rate; and c) calculating the second bit error rate by averaging the corresponding bit error rates calculated in respect of each data frame of the first set.

25. A method as claimed in claim 18, wherein the first and second perturbed values are selected such that the corresponding first and second bit error rates are at least one order of magnitude higher than a nominal bit error rate obtained by using a nominal value of the parameter under normal operating conditions of the data communications network.

26. A method as claimed in claim 17, wherein the parameter is a level of a discrimination threshold of a receiver unit of the data communications system.

27. A method as claimed in claim 26, wherein the first perturbed value is defined by a predetermined first offset above a current value of the discrimination threshold, and the second perturbed value is defined by a predetermined second offset below the current value of the discrimination threshold.

28. A method as claimed in claim 17, wherein the parameter is a timing of a sampling clock of a receiver unit of the data communications system.

29. A method as claimed in claim 28, wherein the first perturbed value is defined by a predetermined phase advance of the sampling clock, and the second perturbed value is defined by a predetermined phase delay of the sampling clock.

30. A method as claimed in claim 17, wherein the parameter is a transmission power of a transmitter unit of the data communications system.

31. A method as claimed in claim 30, wherein the first perturbed value is defined by a predetermined first power offset above a current value of the transmission power, and the second perturbed value is defined by a predetermined second power offset below the current value of the transmission power.

32. An apparatus for optimizing one or more parameters of a data communications system, the apparatus comprising:
  a) means for receiving a data signal over a link of the communications system, the data signal comprising one or more data frames including a respective block of sacrificial bits having a known bit sequence;
  b) means for perturbing a value of a selected parameter of the communications system during reception of the block of sacrificial bits;
  c) means for calculating a bit error rate corresponding to a perturbed value of the selected parameter; and
  d) means for estimating an optimum value of the selected parameter based on the perturbed value of the selected parameter and the corresponding calculated bit error rate.

33. An apparatus as claimed in claim 32, further comprising adjusting means adapted to adjust a value of the selected parameter in accordance with the estimated optimum value.

34. An apparatus as claimed in claim 32, wherein the means for perturbing a value of the selected parameter comprises means for applying a predetermined offset to a current value of the selected parameter.

35. An apparatus as claimed in claim 34, wherein the means for calculating a bit error rate corresponding to the perturbed value of the selected parameter comprises:
  a) sampling means adapted to sample at least a portion of the block of sacrificial bits using the perturbed value of the selected parameter; and
  b) processing means adapted to analyze the sampled portion of the block of sacrificial bits to calculate a bit error rate corresponding to the perturbed value of the selected parameter.

36. An apparatus as claimed in claim 32, wherein the means for receiving a data signal comprises a threshold comparator adapted to compare an incoming data signal to a discrimination threshold to produce a detect signal.

37. An apparatus as claimed in claim 36, wherein the selected parameter is the discrimination threshold of the threshold comparator.

38. An apparatus as claimed in claim 37, wherein the means for perturbing the value of the selected parameter comprises:
  a) means for generating a current value of the discrimination threshold;
  b) means for generating an offset value of the discrimination threshold; and
  c) selector means for applying a selected one of the current value and the offset value of the discrimination threshold to the threshold comparator.

39. An apparatus as claimed in claim 36, wherein the means for receiving a data signal further comprises:
  a) a clock recovery circuit responsive to the data signal and adapted to generate a recovery clock signal substantially phase-locked with the data signal; and
  b) sample means responsive to the clock recovery circuit and adapted to sample the detect signal at a timing of the recovery clock signal.

40. An apparatus as claimed in claim 39, wherein the selected parameter is a timing of the recovery clock signal.

41. An apparatus as claimed in claim 40, wherein the means for perturbing the selected parameter comprises means for selectively adjusting a phase of the recovery clock signal.

42. An apparatus as claimed in claim 41, wherein the means for selectively adjusting a phase of the recovery clock signal comprises:
  a) phase offset means adapted to generate a phase-offset clock signal having a respective frequency matched to the clock signal and a respective phase offset from the clock signal;
  b) selection means adapted to apply a selected one of the clock signal and the phase-offset clock signal to the sample means.

43. An apparatus as claimed in claim 39, wherein at least the threshold comparator and the selector means are incorporated within a common integrated circuit.

44. A data communications system comprising an optimization subsystem for optimizing one or more parameters of a data communications system, the optimization subsystem comprising:
  a) means for perturbing a value of a selected parameter of the communications system during reception of the block of sacrificial bits;
  b) means for calculating a bit error rate corresponding to a perturbed value of the selected parameter; and
  c) means for estimating an optimum value of the selected parameter based on the perturbed value of the selected parameter and the corresponding calculated bit error rate.

45. A data communications system as claimed in claim 44, further comprising adjusting means adapted to adjust a value of the selected parameter in accordance with the estimated optimum value.

46. A data communications system as claimed in claim 44, wherein the means for perturbing a value of the selected parameter comprises means for applying a predetermined offset to a current value of the selected parameter.

47. A data communications system as claimed in claim 46, wherein the means for calculating a bit error rate corresponding to the perturbed value of the selected parameter comprises:
  a) sampling means adapted to sample at least a portion of the block of sacrificial bits using the perturbed value of the selected parameter; and b) processing means adapted to analyze the sampled portion of the block of sacrificial bits to calculate a bit error rate corresponding to the perturbed value of the selected parameter.

48. A data communications system as claimed in claim 44, further comprising a threshold comparator adapted to compare the incoming data signal to a discrimination threshold to produce a detect signal.

49. A data communications system as claimed in claim 48, wherein the selected parameter is the discrimination threshold of the threshold comparator.

50. A data communications system as claimed in claim 49, wherein the means for perturbing the value of the selected parameter comprises:
   a) means for generating a current value of the discrimination threshold;
   b) means for generating an offset value of the discrimination threshold; and
   c) selector means for applying a selected one of the current value and the offset value of the discrimination threshold to the threshold comparator.

51. A data communications system as claimed in claim 48, further comprising:
   a) a clock recovery circuit responsive to the incoming data signal and adapted to generate a recovery clock signal substantially phase-locked with the incoming data signal; and
   b) sample means responsive to the clock recovery circuit and adapted to sample the detect signal at a timing of the recovery clock signal.

52. A data communications system as claimed in claim 51, wherein the selected parameter is a timing of the recovery clock signal.

53. A data communications system as claimed in claim 52, wherein the means for perturbing the selected parameter comprises means for selectively adjusting a phase of the recovery clock signal.

54. A data communications system as claimed in claim 53, wherein the means for selectively adjusting a phase of the recovery clock signal comprises:
   a) phase offset means adapted to generate a phase-offset clock signal having a respective frequency matched to the clock signal and a respective phase offset from the clock signal;
   b) selection means adapted to apply a selected one of the clock signal and the phase-offset clock signal to the sample means.

55. A data communications system as claimed in claim 50, wherein at least the threshold comparator and the selector means are incorporated within a common integrated circuit.

* * * * *